US012168725B2

(12) United States Patent
Cassidy et al.

(10) Patent No.: US 12,168,725 B2
(45) Date of Patent: *Dec. 17, 2024

(54) FOAM COMPOSITES AND METHODS OF PREPARATION THEREOF

(71) Applicant: Westlake Royal Building Products (USA) Inc., Houston, TX (US)

(72) Inventors: Edward F. Cassidy, Corpus Christi, TX (US); Ying Zhang, Wildwood, MO (US); Xi Zhang, Mechanicsburg, PA (US); Matthew Yatco Meneses, San Antonio, TX (US); Hamed Lakrout, San Antonio, TX (US)

(73) Assignee: Westlake Royal Building Products (USA) Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,676

(22) Filed: Mar. 6, 2023

(65) Prior Publication Data

US 2023/0203262 A1  Jun. 29, 2023

Related U.S. Application Data

(63) Continuation of application No. 17/256,457, filed as application No. PCT/US2018/040231 on Jun. 29, 2018, now Pat. No. 11,634,553.

(51) Int. Cl.
| | | |
|---|---|---|
| *C08J 9/14* | (2006.01) | |
| *C08G 18/42* | (2006.01) | |
| *C08G 18/76* | (2006.01) | |
| *C08J 9/00* | (2006.01) | |
| *C08K 5/00* | (2006.01) | |
| *C08K 11/00* | (2006.01) | |
| C08G 101/00 | (2006.01) | |

(52) U.S. Cl.
CPC .......... *C08J 9/146* (2013.01); *C08G 18/4222* (2013.01); *C08G 18/7671* (2013.01); *C08J 9/0038* (2013.01); *C08J 9/0066* (2013.01); *C08K 5/0066* (2013.01); *C08K 11/005* (2013.01); *C08G 2101/00* (2013.01); *C08G 2110/0058* (2021.01); *C08G 2330/00* (2013.01); *C08J 2203/162* (2013.01); *C08J 2205/052* (2013.01); *C08J 2375/04* (2013.01)

(58) Field of Classification Search
CPC ............ C08G 18/4222; C08G 18/7671; C08G 2101/00; C08G 2110/0058; C08G 2330/00; C08J 9/0038; C08J 9/0066; C08J 9/14; C08J 9/146; C08J 2203/162; C08J 2205/052; C08J 2375/04; C08K 5/0066; C08K 5/521; C08K 11/005
See application file for complete search history.

(56) References Cited

U.S. PATENT DOCUMENTS

| | | | |
|---|---|---|---|
| 3,467,606 A | 9/1969 | Rice et al. | |
| 4,005,035 A | 1/1977 | Deaver | |
| 4,062,999 A | 12/1977 | Kondo et al. | |
| 4,661,533 A | 4/1987 | Stobby | |
| 4,883,826 A | 11/1989 | Marugg et al. | |
| 5,064,876 A | 11/1991 | Hamada et al. | |
| 5,082,738 A | 1/1992 | Swofford | |
| 5,104,904 A | 4/1992 | Glynn et al. | |
| 5,508,315 A | 4/1996 | Mushovic | |
| 5,922,779 A | 7/1999 | Hickey | |
| 6,031,012 A | 2/2000 | Nakanishi et al. | |
| 6,136,870 A | 10/2000 | Triolo et al. | |
| 6,211,259 B1 | 4/2001 | Borden et al. | |
| 6,486,224 B2 | 11/2002 | Lin et al. | |
| 6,602,379 B2 | 8/2003 | Li et al. | |
| 6,602,927 B1 | 8/2003 | Rothacker | |
| 7,241,504 B2 | 7/2007 | Verborgt et al. | |
| 7,794,817 B2 | 9/2010 | Brown | |
| 7,879,144 B2 | 2/2011 | Hemmings et al. | |
| 8,138,234 B2 | 3/2012 | Brown | |
| 9,932,457 B2 | 4/2018 | Hill et al. | |
| 10,324,978 B2 | 6/2019 | Hill et al. | |

(Continued)

FOREIGN PATENT DOCUMENTS

| | | | |
|---|---|---|---|
| CN | 106046762 A | 10/2016 | |
| CN | 106188494 A | 12/2016 | |

(Continued)

OTHER PUBLICATIONS

Anater et al. "Achieving Performance and Sustainability Objectives With Biobased Polyols," *Paint & Coatings Industry*, pp. 1-8, May 2017.

(Continued)

*Primary Examiner* — John M Cooney
(74) *Attorney, Agent, or Firm* — Bookoff McAndrews, PLLC

(57) ABSTRACT

Foam composites and methods of preparation thereof are discussed. For example, the foam composite may include a polymeric material and a particulate filler, wherein the compressive strength of the foam composite is equal to or greater than 20 psi, the density is 4 pcf to 40 pcf, and wherein the thermal conductivity is equal to or less than 0.050 W/n K, the particulate filler may include fly ash. e.g., in an amount of about of 45% to about 75% by weight with respect to the total weight of the foam composite. The foam composite may be prepared from a mixture of a polyol, an isocyanate, the particulate filler, and a liquid blowing agent having a boiling point equal to or greater than 25° C. or 30° C.

20 Claims, No Drawings

(56) References Cited

U.S. PATENT DOCUMENTS

| | | | |
|---|---|---|---|
| 10,377,868 | B2 | 8/2019 | Kumar et al. |
| 11,198,753 | B2 | 12/2021 | Lakrout et al. |
| 11,634,553 | B2 * | 4/2023 | Cassidy ................ C08J 9/0038 521/85 |
| 2004/0229052 | A1 | 11/2004 | Ahluwalia et al. |
| 2007/0027227 | A1 | 2/2007 | Shutov |
| 2009/0295021 | A1 | 12/2009 | Brown |
| 2010/0116179 | A1 | 5/2010 | Baker et al. |
| 2011/0031059 | A1 | 2/2011 | Parish et al. |
| 2011/0086931 | A1 | 4/2011 | Herrington et al. |
| 2011/0086933 | A1 | 4/2011 | Herrington et al. |
| 2011/0086934 | A1 | 4/2011 | Herrington et al. |
| 2011/0198031 | A1 | 8/2011 | Burckhardt |
| 2012/0029145 | A1 | 2/2012 | Brown |
| 2012/0172476 | A1 | 7/2012 | Costa et al. |
| 2014/0171527 | A1 | 6/2014 | Yu et al. |
| 2015/0210039 | A1 | 7/2015 | Simmons et al. |
| 2016/0002386 | A1 | 1/2016 | Wolek et al. |
| 2016/0280874 | A1 | 9/2016 | Crocco et al. |
| 2017/0114211 | A1 | 4/2017 | Kumar et al. |
| 2017/0158801 | A1 | 6/2017 | Rider et al. |
| 2017/0267585 | A1 | 9/2017 | Kumar et al. |
| 2017/0335075 | A1 | 11/2017 | Bicerano |
| 2017/0369708 | A1 | 12/2017 | Kokel et al. |
| 2018/0066100 | A1 | 3/2018 | Menon et al. |
| 2018/0105633 | A1 | 4/2018 | Van der Puy et al. |

FOREIGN PATENT DOCUMENTS

| | | |
|---|---|---|
| CN | 106279631 A | 1/2017 |
| WO | WO 1999/057169 A1 | 11/1999 |
| WO | WO 2008/045342 A2 | 4/2008 |
| WO | WO 2011/020015 A1 | 2/2011 |
| WO | WO 2017/180154 A1 | 10/2017 |
| WO | WO 2017/204778 A1 | 11/2017 |

OTHER PUBLICATIONS

Ata, S. et al., "Optean 1100: Cold Chain Application Developments," American Chemistry Council, 2017.

Binici et al., "Engineering Properties of Composites Containing Polyurethane, Wheat Stalk and Corn Stalk Ash, Peanut Shell Ash, Fly Ash, Sawdust, Perlite, Barite and Gypsum," *Eur. J. Eng. Technol.*, vol. 4, No. 3, pp. 35-45 (2016) (16 pages).

Dow, "Vorapel™ Hydrophobic Polyols for Improved Moisture and Chemical Resistance in High-Performance Case Applications," Durable Science, (2019).

Kim, S.H. et al., "Effect of Isocyanate Index on the Properties of Rigid Polyurethane Foams Blown by HFC 365mfc," *Macromolecular Research*, vol. 16, No. 5, pp. 467-472 (2008).

Oertel et al. "Polyurethane Handbook: Chemistry, Raw Materials, Processing Application, Properties," $2^{nd}$ Edition, pp. 136-137, 182-83, and 252-53, 1994.

Physics Forums, "How does density affect thermal conductivity?" May 14, 2015 (5 pages), available at https://www.physicsforums.com/threads/how-does-density-affect-thermal-conductivity.813938/.

"Solstice Liquid Blowing Agent Technical Information," Honeywell, 2017 (8 pages).

Wu et al. "Rheology Study in Polyurethane Rigid Foams," 2008.

International Search Report for PCT/US2018/040231 dated Nov. 30, 2018 (3 pages).

* cited by examiner

FOAM COMPOSITES AND METHODS OF PREPARATION THEREOF

CROSS-REFERENCE TO RELATED APPLICATIONS

This application is a continuation of U.S. application Ser. No. 17,256, 457, filed on Dec. 28, 2020, which is the U.S. national phase entry under 35 U.S.C. § 371 of International Application No. PCT/US2018/040231, filed on Jun. 29, 2018, which is incorporated herein by reference in its entirety.

The present disclosure generally relates to foam composites, e.g., comprising polymer material and a particulate filler, and methods of use and preparation thereof.

BACKGROUND

Foams prepared from polyurethane and other polymers are useful for a variety of materials. The manufacturing process of such foams typically includes incorporating a blowing agent into the polymer medium in order to trap gas within the matrix and establish a structure of cells. Fluids commonly used as the blowing agent include hydrofluorocarbons (HFCs) due to their beneficial thermodynamic properties. However, some HFC-based blowing agents such as tetrafluoroethane (HFC 134a) and pentafluoropropane (HFC 245fa) are expected to be phased out due to their ozone-depleting potential (ODP) and global warming potential (GWP).

Selecting alternative blowing agents that meet ODP and GWP requirements present many challenges. Many substances that can serve as physical or chemical blowing agents are not suitable for making polymeric foams of the desired properties. Chemical blowing agents such as water can produce friable products due to an excess amount of urea generated. Various physical blowing agents are not suitable due to the exothermal nature of the reaction. Further, such agents typically have boiling points below room temperature, which brings difficulties in transportation and processing due to significant evaporation loss.

SUMMARY

The present disclosure includes foam composites comprising a polymeric material and a particulate filler. For example, the foam composite may have a compressive strength equal to or greater than 20 psi, a density of 2 pcf to 40 pcf, and a thermal conductivity equal to or less than 0.050 W/m·K. The polymeric material may be prepared from an isocyanate, for example, the polymeric material having an isocyanate index equal to or less than 130. The polymeric material may comprise, consist essentially of, or consist of polyurethane. In some examples, the polymer mixture may comprise polyurethane and polyurea. In some embodiments, the glass transition temperature, the melting point, and/or the thermal degradation temperature of the foam composite is less than 400° C. or less than 200° C., such as 100° C. to 400° C. or 50° C. to 200° C. In at least one example, the foam composite comprises 25% to 75% by weight, e.g., about 50% by weight, of the particulate filler with respect to the total weight of the foam composite, optionally wherein the particulate filler comprises, consists essentially of, or consists of fly ash. The foam composite may be prepared with a liquid blowing agent comprising water, an organic liquid having a boiling point equal to or greater than 30° C., such as hexafluorobutene, or a combination thereof, and wherein the foam composite has a closed cell content equal to or greater than 50%. In some examples, the compressive strength is 20 psi to 200 psi, the density is 4 pcf to 10 pcf, the thermal conductivity is 0.020 W/m·K to 0.050 W/m·K, the flexural strength is 20 psi to 100 psi, and/or the moisture permeance per 25 mm thickness is equal to or less than 146 ng/m²·s·Pa. The foam composite may comprise a flame retardant, such as tris(chloropropyl)phosphate, a surfactant, a catalyst, or a combination thereof.

The present disclosure also includes a foam composite comprising polyurethane and fly ash in an amount of 45% to 75% by weight, e.g., 50% by weight, with respect to the total weight of the foam composite; wherein at least one of a glass transition temperature, a melting point, or a thermal degradation temperature of the foam composite is 50° C. to 200° C. or 100° C. to 400° C.; and wherein the foam composite has a closed cell content equal to or greater than 50%; a compressive strength equal to or greater than 20 psi; a density of 2 pcf to 25 pcf, such as 2 pcf to 10 pcf or 4 pcf to 10 pcf; and a thermal conductivity equal to or less than 0.050 W/m·K, such as equal to or less than 0.030 W/m·K.

The present disclosure also includes a method of preparing a foam composite, the method comprising providing a mixture of a polyol, an isocyanate, a particulate filler, and a liquid blowing agent having a boiling point equal to or greater than 30° C.; and foaming the mixture to obtain the foam composite; wherein the foam composite has a density of 2 pcf to 40 pcf, and a thermal conductivity equal to or less than 0.050 W/m·K. For example, the liquid blowing agent may comprise water, a hydrofluoroolefin, or a combination thereof, e.g., water and hexafluorobutene in a weight ratio of water to hexafluorobutene of 0.05 to about 0.5. The foaming may comprise free rise foaming. In other embodiments, the foaming may be in a mold or in situ. For instance, the foaming may occur adjacent to a mold surface or a building surface such that a portion of the foam cell structure contacting such surface compresses or collapses. A portion of the foam cell structure compressed or collapsed may form a skin structure. In some examples, a combined cream time and tack-free time of the mixture 5 seconds to 1 hour, optionally wherein the cream time of the mixture is 5 seconds to 3 minutes and the tack-free time of the mixture is 20 seconds to 25 minutes. The method may include mixing the polyol and the isocyanate for 5 seconds to 1 minute. The mixture may further comprise an additive selected from a flame retardant, a surfactant, a catalyst, or a combination thereof. The foaming may be performed at a temperature of 50° C. to 120° C. In some examples, the method is devoid of a heating step.

The present disclosure also includes a foam composite comprising a polymeric material and a particulate filler in an amount of 25% by weight to about 75% by weight with respect to the total weight of the foam composite; wherein the foam composite has a density of 2 pcf to 10 pcf, and a thermal conductivity of 0.020 W/m·K to 0.040 W/m·K. The foam composite may further comprise a flame retardant selected from an organohalogen compound, organophosphorus compound, or a combination thereof, such as tris(chloropropyl)phosphate. Any of the foam composites herein may be used in insulation, e.g., in building materials.

DETAILED DESCRIPTION

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass 15% of a specified amount or value. All ranges are understood to include endpoints, e.g., a molecular weight between 250 g/mol and 1000 g/mol includes 250 g/mol, 1000 g/mol, and all values between.

The present disclosure includes preparation of foam composites from a polymer mixture, such as, e.g., polyurethane, polyurea, and polyisocyanurate foam composites, and combinations thereof. The term "foam composite" as used herein includes all types of foam compositions and foam products, including foam stocks, buns, bun stocks, and foam bun stocks. In some examples, the foam composite may be prepared using a blowing agent, wherein the method of preparation reduces or eliminates weight loss due to evaporation of blowing agents. Embodiments of the present disclosure may have one or more of the following advantages: ease of achieving low density, rigid polymer foams; reduced material losses during transportation and processing; improved mechanical properties and/or insulation performance; and/or processes that are more environmentally friendly, e.g., use of blowing agents with low global warming and ozone depleting potentials.

The foam composites herein may comprise a polymer material, e.g., prepared by foaming a mixture comprising one or more isocyanates and one or more polyols. Isocyanates suitable for use in preparing the foam composites herein may include one or more monomeric or oligomeric poly- or di-isocyanates. The monomeric or oligomeric poly- or di-isocyanates include aromatic diisocyanates and polyisocyanates. The particular isocyanate used in the mixture may be selected based on the desired viscosity of the mixture used to produce the foam composite. For example, a low viscosity may be desirable for ease of handling. Other factors that may influence the particular isocyanate can include the overall properties of the foam composite, such as the amount of foaming, strength of bonding to a particulate filler, wetting of inorganic particulates in the mixture, strength of the resulting foam, stiffness (elastic modulus), and reactivity. Suitable isocyanate compositions for forming the mixture include those having viscosities of 25 cP to 700 cP at 25° C., such as 30 cP to 600 cP, 50 cP to 500 cP, 100 cP to 300 cP, or 300 cP to 500 cP. The average functionality of isocyanates useful for the foam composite herein can be 1.5 to 5.0, such as 2.0 to 4.5, 2.2 to 4.0, 2.4 to 3.7, 2.6 to 3.4, or 2.8 to 3.2.

In some aspects of the present disclosure, the mixture may comprise a diisocyanate. Exemplary diisocyanates include, but are not limited to, methylene diphenyl diisocyanate (MDI), including MDI monomers, oligomers, and combinations thereof. Further examples of isocyanates that may be used herein include those having N=C=O (i.e., the reactive group of an isocyanate) contents of about 25% to about 35% by weight. Suitable examples of aromatic polyisocyanates include 2,4-toluene diisocyanate and 2,6-toluene diisocyanate, including mixtures thereof; p-phenylene diisocyanate; tetramethylene diisocyanate; hexamethylene diisocyanate; 4,4-dicyclohexylmethane diisocyanate; isophorone diisocyanate; 4,4-phenylmethane diisocyanate; polymethylene, polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. In some examples, the mixture used to prepare the foam composite comprises a blocked isocyanate or prepolymer isocyanate. Suitable blocked isocyanates are formed by the treatment of the isocyanates described herein with a blocking agent (such as, e.g., diethyl malonate, 3,5-dimethylpyrazole, methylethylketoxime, or caprolactam). Additional examples of useful isocyanates may be found in Polyurethane Handbook: Chemistry, Raw Materials, Processing Application, Properties, 2nd Edition, Ed: Gunter Oertel; Hanser/Gardner Publications, Inc., which is incorporated by reference herein.

The foam composites herein may comprise one or more polyols, which may be in liquid form. For example, liquid polyols having relatively low viscosities generally facilitate mixing. Suitable polyols include those having viscosities of 6000 cP or less at 25° C., such as a viscosity of 150 cP to 5000 cP, 250 cP to 4500 cP, 500 cP to 4000 cP, 750 cP to 3500 cP, 1000 cP to 3000 cP, or 1500 cP to 2500 cP at 25° C. Further, for example, the polyol(s) may have a viscosity 5000 cP or less, 4000 cP or less, 3000 cP or less, 2000 cP or less, 1000 cP or less, or 500 cP or less at 25° C.

The polyol(s) useful for the foam composites herein may have an average equivalent weight of 150 g/eq or greater, such as 150 g/eq to 700 g/eq. For example, the polyol(s) may have an average equivalent weight of 175 g/eq or greater, 200 g/eq or greater, 210 g/eq or greater, 220 g/eq or greater, 225 g/eq or greater, or 230 g/eq or greater, and/or an average equivalent weight of 700 g/eq or less, 550 g/eq or less, 500 g/eq or less, 450 g/eq or less, 400 g/eq or less, 350 g/eq or less, 300 g/eq or less, 275 g/eq or less, 250 g/eq or less, or 235 g/eq or less. In some cases, the one or more polyols have an average equivalent weight between 175 g/eq and 700 g/eq, between 200 g/eq and 700 g/eq, between 150 g/eq and 500 g/eq, between 150 g/eq and 400 g/eq, or between 150 g/eq and 300 g/eq. In some embodiments, the foam composite does not include, and is not prepared from, any polyols having an equivalent weight of 750 g/eq or greater.

The polyols useful for the foam composites herein may include compounds of different reactivity, e.g., having different numbers of primary and/or secondary hydroxyl groups. Polyols with lower reactivity generally provide for longer cream times and/or tack-free times of a polyurethane, polyurea, or polyisocyanurate (or combinations thereof) mixture. In some embodiments, the one or more polyols may be capped with an alkylene oxide group, such as ethylene oxide, propylene oxide, butylene oxide, and combinations thereof, to provide the polyols with the desired reactivity. In some examples, the one or more polyols can include a poly(propylene oxide) polyol including terminal secondary hydroxyl groups, the compounds being end-capped with ethylene oxide to provide primary hydroxyl groups.

In some embodiments, the foam composite is prepared from one or more polyols having a primary hydroxyl number less than 220 (as measured in units of mg KOH/g), such as 10 to 220, 50 to 200, or 100 to 150. Further, for example, the polyol(s) may have a primary hydroxyl number less than 200, less than 160, less than 120, less than 100, less than 80, less than 60, less than 40, or less than 20. The number of primary hydroxyl groups can be determined using fluorine NMR spectroscopy as described in ASTM D4273.

In some embodiments, the polyol(s) have a hydroxyl number or average hydroxyl number (as measured in units of mg KOH/g) of 1000 or less, 800 or less, 700 or less, 650 or less, 600 or less, 550 or less, 500 or less, 450 or less, 400 or less, 350 or less, 300 or less, 250 or less, 200 or less, or 150 or less, and/or 50 or more, 100 or more, 150 or more, 200 or more, 250 or more, 300 or more, 350 or more, 400 or more, 450 or more, or 500 or more. For example, the average hydroxyl number may be 100 to 700, 100 to 500, 400 to 500, 300 to 400, 300 to 350, or 200 to 400, e.g., about 200, about 300, or about 400. In some embodiments, the foam is prepared by a mixture of two or more polyols. For example, the one or more polyols used to prepare the foam may comprise a blend of 75% of a polyol having a hydroxyl number of 400 and 25% of a polyol having a hydroxyl number of 100 to produce an average hydroxyl number of 325.

The polyols useful for preparation of the foam composites herein may include at least one amine group, such as one or more primary amine groups, secondary amine groups, tertiary amine groups, or combinations thereof. In some embodiments, the total amine value (a measure of the concentration of primary, secondary, and tertiary amine groups in units of mg KOH/g) is 50 or less, 45 or less, 40 or less, 35 or less, 30 or less, 25 or less, 20 or less, 15 or less, 10 or less, or 5 or less. For example, the polyol(s) may have a total amine value (mg KOH/g) of greater than 0 to 50, 10 to 30, or 5 to 15.

The polyol(s) useful for the present disclosure may have a desired functionality. For example, the functionality of the polyol(s) may be 7.0 or less. e.g., 2.0 to 7.0, or 3.0 to 5.0. In some examples, the functionality of the polyol(s) may be 6.5 or less, 6.0 or less, 5.5 or less, 5.0 or less, 4.5 or less, 4.0 or less, 3.5 or less, 3.0 or less, 2.5 or less, and/or 2.0 or greater, 2.5 or greater, 3.0 or greater, 3.5 or greater, or 4.0 or greater. The average functionality of the one or more polyols useful for the foam composites herein may be 2.0 to 5.5, 3.0 to 5.5, 3.0 to 5.0, 3.0 to 4.5, 2.5 to 4.0, 2.5 to 3.5, or 3.0 to 4.0.

The polyol(s) useful for the foam composites herein may have an average molecular weight of 250 g/mol or greater and/or 1500 g/mol or less. For example, the polyol(s) may have an average molecular weight of 300 g/mol or greater, 350 g/mol or greater, 400 g/mol or greater, 450 g/mol or greater, 500 g/mol or greater, 550 g/mol or greater, 600 g/mol or greater, 700 g/mol or greater, 800 g/mol or greater, 900 g/mol or greater, 1000 g/mol or greater, 1200 g/mol or greater, or 1400 g/mol or greater, and/or 1500 g/mol or less, 1400 g/mol or less, 1300 g/mol or less, 1200 g/mol or less, 1100 g/mol or less, 1000 g/mol or less, 900 g/mol or less, 800 g/mol or less, 700 g/mol or less, 600 g/mol or less, 550 g/mol or less, 500 g/mol or less, 450 g/mol or less, 400 g/mol or less, or 300 g/mol or less. In some cases, the one or more polyols have an average molecular weight of 250 g/mol to 1000 g/mol, 500 g/mol to 1000 g/mol, or 750 g/mol to 1250 g/mol. In some embodiments, the foam composite does not comprise or is not prepared from any polyols having a molecular weight of 1000 g/mol or greater.

As mentioned above, the polyol(s) and functional groups thereof may provide for a delay in the cream time and/or tack free time of the mixture during foaming to prepare the foam composite. For example, the mixture may comprise one or more polyols that contain glycerine and/or amine groups, which may lead to longer cream times and/or tack free times. In some embodiments, the cream time of the mixture may be 40 seconds or greater, such as between 40 seconds and 120 seconds or between 45 seconds and 90 seconds. Additionally or alternatively, the tack-free time of the mixture may be 90 seconds or greater, such as between 90 seconds and 10 minutes, or between 2 minutes and 5 minutes.

Polyols useful for the foam composites herein include, but are not limited to, aromatic polyols, polyester polyols, poly ether polyols, Mannich polyols, and combinations thereof. Exemplary aromatic polyols include, for example, aromatic polyester polyols, aromatic polyether polyols, and combinations thereof. The aromatic polyol(s) can have an aromaticity of 35% or greater, such as between 35% and 80%, between 40% and 70%, between 45% and 55%, or between 35% and 50%. For example, the aromatic polyol(s) may have an aromaticity of 75% or less, 70% or less, 65% or less, 60% or less, 55% or less, 50% or less, 45% or less, or 40% or less. Examples of aromatic polyols that may be used herein include low viscosity polyester polyols, e.g., having a viscosity less than 6000 cP at 25° C. In some examples, the at least one polyol includes an aromatic polyester polyol having a hydroxyl number of 400 to 500 mg KOH/g, a viscosity of 500 cP to 1,500 cP at 25° C., and a functionality of 2.0. Exemplary polyester and poly ether polyols useful in the present disclosure include, but are not limited to, glycerin-based polyols and derivatives thereof, polypropylene-based polyols and derivatives thereof, and poly ether polyols such as ethylene oxide, propylene oxide, butylene oxide, and combinations thereof that are initiated by a sucrose and/or amine group. Examples of such polyols that may be used herein include low viscosity polyols, e.g., having a viscosity less than 3000 cP at 25° C. In some examples, the at least one polyol includes an aromatic polyester polyol having a hydroxyl number of 300 to 350 mg KOH/g, a viscosity of 2,500 cP to 3,000 cP at 25° C., and a functionality of 2.0. Mannich polyols are the condensation product of a substituted or unsubstituted phenol, an alkanolamine, and formaldehyde. Examples of Mannich polyols that may be used include, but are not limited to, ethylene and propylene oxide-capped Mannich polyols.

Exemplary polyols that may be used for the foam composites herein include, but are not limited to, glycerine-initiated polyether polyol; glycerine and propylene oxide based polyether polyol triol with ethylene oxide cap; sucrose/amine initiated polyether polyol; sucrose diethanolamine and propylene oxide based polyether polyol; polyester polyol formed as a reaction product of terephthalic acid or anhydride, a polyhydroxyl compound, and an alkoxylating agent; and polyester polylols formed from phthalic acid-based materials selected from the group consisting of phthalic anhydride, phthalic acid, isophthalic acid, terephthalic acid, methyl esters of phthalic, isophthalic, or terephthalic acid, dimethyl terephthalate, polyethylene terephthalate, trimellitic anhydride, pyromellitic dianhydride, maleic anhydride, mixtures thereof, and any combinations thereof. For instance, a polyester polyol used herein can be the reaction product of an aromatic dicarboxylic acid or anhydride, a polyhydroxyl compound, and an alkoxylating agent, e.g., propylene oxide. The polyester polyol intermediates can be from the condensation of an aromatic dicarboxylic acid or anhydride and ethylene glycol, diethylene glycol, propylene glycol, dipropylene glycol, neopentyl glycol, 1,4-butanediol, 1,6-hexanediol, polyethylene glycol, polypropylene glycol triethylene glycol, and tetramethylene glycol, and/or mixtures thereof.

In some embodiments, the mixture comprising a blend of the one or more polyols and the one or more isocyanates may have a viscosity of 100 cP to 6000 cP, 100 cP to 2500 cP, 100 cP to 1400 cP, or 100 cP to 1000 cP at 25° C. In some examples, the foam composite is prepared from a mixture comprising a polyester polyol having a hydroxyl number of 300 mg KOH/g to 330 mg KOH/g, an average molecular weight of 320 g/mol to 365 g/mol, and an average functionality of 2.0 or greater. For example, the polyester polyol may be an aromatic polyol. Additionally or alternatively, the mixture may comprise an aromatic polyester polyol having a hydroxyl number of 410 mg KOH/g to 460 mg KOH/g, and an average functionality of 2.0 or greater.

The mixture used to prepare the foam composite optionally may comprise one or more additional isocyanate-reactive monomers. When present, the additional isocyanate-reactive monomer(s) can be present in an amount of 30% or less, 25% or less, 20% or less, 15% or less, 10% or less, or 5% or less by weight, based on the weight of the one or more polyols. Exemplary isocyanate-reactive monomers include, for example, polyamines corresponding to the polyols described herein (e.g., a polyester polyol or a poly ether polyol), wherein the terminal hydroxyl groups are converted to amino groups, for example by amination or by reacting the hydroxyl groups with a diisocyanate and subsequently hydrolyzing the terminal isocyanate group to an amino group. For example, the polymer mixture may comprise a poly ether polyamine, such as polyoxyalkylene diamine or polyoxyalkylene triamine.

In some embodiments, the mixture may comprise an alkoxylated polyamine (e.g., alkylene oxide-capped polyamines) derived from a polyamine and an alkylene oxide. Alkoxylated polyamines may be formed by reacting a suitable polyamine (e.g., monomeric, oligomeric, or polymeric polyamines) with a desired amount of an alkylene oxide. The polyamine may have a molecular weight less than 1000 g/mol, such as less than 800 g/mol, less than 750 g/mol, less than 500 g/mol, less than 250 g/mol, or less than 200 g/mol. Examples of polyamines that may be used to form alkoxylated polyamines suitable for the present disclosure include, but are not limited to, ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof. Any suitable alkylene oxide or combination of alkylene oxides can be used to cap the polyamine, such as ethylene oxide, propylene oxide, butylene oxide, or a combination thereof. Examples of alkylene oxide-capped polyamines include propylene oxide-capped ethylene diamine and ethylene and propylene oxide-capped ethylene diamine.

In some embodiments, the ratio of number of isocyanate groups to the total number of isocyanate reactive groups (e.g., hydroxyl groups, amine groups, and water) in the mixture is 0.5:1 to 1.5:1, which when multiplied by 100 produces an isocyanate index of 50 to 150. In some embodiments, the mixture may have an isocyanate index equal to or less than 140, equal to or less than 130, or equal to or less than 120. For example, with respect to a mixture used to prepare some polyurethane foams herein, the isocyanate index may be 80 to 140, 90 to 130, or 100 to 120. Further, for example, with respect to polyisocyanurate foams, the isocyanate index may be 180 to 380, such as 180 to 350 or 200 to 350. In some examples, an isocyanate may be selected to provide a reduced isocyanate index without compromising the chemical or mechanical properties of the foam composite. The isocyanate index generally relates to insulative capacity and friability, wherein the friability rating improves with increased compressive modulus. In some examples, a higher isocyanate index may provide for increased compressive modulus and an improved friability rating.

The foam composites herein may be prepared with a catalyst, e.g., to facilitate curing and control curing times. Examples of suitable catalysts include, but are not limited to catalysts that comprise amine groups (including, e.g., tertiary amines such as 1,4-diazabicyclo[2.2.2]octane (DABCO), tetramethylbutanediamine, and diethanolamine) and catalysts that contain tin, mercury, or bismuth. In some embodiments, the catalyst is a delayed-action tin catalyst. The amount of catalyst in the mixture may be 0.01 wt % and 2 wt % based on the weight of the mixture (e.g., polyurethane mixture, polyurea mixture, or polyisocyanurate mixture). For example, the amount of catalyst may be between 0.05 wt % and 0.5 wt %, or 0.1 wt % and 0.25 wt %. In some embodiments, the mixture may comprise between 0.05 and 0.5 parts per hundred parts of polyol.

The foam composites herein may comprise a filler material, such as, e.g., an inorganic particulate material. For example, the particulate filler may be added to the mixture prior to foaming the mixture to produce the foam composite. Examples of particulate fillers useful for the foam composites herein include fly ash, amorphous carbon (e.g., carbon black), silica (e.g., silica sand, silica fume, quartz), glass (e.g., ground/recycled glass such as window or bottle glass, milled glass, glass spheres, glass flakes), calcium carbonate, calcium oxide, calcium hydroxide, aluminum trihydrate, clay (e.g., kaolin, red mud clay, bentonite), mica, talc, wollastonite, alumina, feldspar, gypsum (calcium sulfate dehydrate), garnet, saponite, beidellite, granite, slag, antimony trioxide, barium sulfate, magnesium oxide, magnesium hydroxide, aluminum hydroxide, gibbsite, titanium dioxide, zinc carbonate, zinc oxide, molecular sieves, perlite (including expanded perlite), diatomite, vermiculite, pyrophillite, expanded shale, volcanic tuff, pumice, hollow ceramic spheres, hollow plastic spheres, expanded plastic beads (e.g., polystyrene beads), ground tire rubber, and mixtures thereof.

In some embodiments, the particulate filler may comprise an ash produced by firing fuels including coal, industrial gases, petroleum coke, petroleum products, municipal solid waste, paper sludge, wood, sawdust, refuse derived fuels, switchgrass or other biomass material. For example, the particulate filler may comprise a coal ash, such as fly ash. bottom ash, or combinations thereof. Fly ash is generally produced from the combustion of pulverized coal in electrical power generating plants. In some examples herein, the foam comprises fly ash selected from Class C fly ash, Class F fly ash, or a mixture thereof. In some embodiments, the particulate filler consists of or consists essentially of fly ash. In some embodiments, the particulate filler comprises, consists of, or consists essentially of Class C fly ash. In some embodiments, the particulate filler comprises fly ash and gypsum.

The particulate filler may have an average particle size diameter of 0.2 µm to 100 µm, such as 0.2 µm to 15 µm. 10 µm to 50 µm, 5 µm to 15 µm, 35 µm to 80 µm, or 70 µm to 100 m. In some embodiments, the particulate filler has an average particle size diameter of 0.2 µm or more, 0.5 µm or more, 1 m or more, 5 µm or more, 10 m or more, 20 µm or more, 25 µm or more, or 50 µm or more, e.g., between 50 µm and 150 µm or between 100 µm and 250 µm. In some embodiments, the particulate filler has an average particle size of 95 µm or less, 90 µm or less, 85 µm or less, 80 µm or less, 75 µm or less, 70 µm or less, 65 µm or less, 60 µm or less, 55 µm or less, 50 µm or less, 45 µm or less, 40 µm or less, 35 µm or less, 30 µm or less, or 25 µm or less, e.g., between 10 µm and 15 µm or between 2 µm and 10 µm.

In some embodiments, the particulate filler has a particle size distribution with at least two modes, e.g., two, three, four, or five or more modes. For example, the particle size distribution of the particulate filler can include 11-35% of the particles by volume in a first mode (0.2 µm to 1.5 µm) and 65-89% of the particles by volume in the second mode (3 µm to 40 µm); or 11-17% of the particles by volume in the first mode (0.2 µm to 1.5 µm), 56-74% of the particles by volume in the second mode (0.2 μm to 1.5 μm), and 12-31% of the particles by volume in the third mode (40 μm to 100 μm). In some examples, the particulate filler may include an ultrafine mode with an average particle diameter of 0.05 μm to 0.2 μm and/or a coarse particle with an average particle diameter of 100 μm to 500 μm.

The particulate filler can be present in the foam composite in an amount of 35% to 90% by weight, such as 45% to 75%, or 50% to 80% by weight, based on the total weight of the foam composite. For example, the amount of particulate filler may be about 35%, about 38%, about 40%, about 42%, about 45%, about 48%, about 50%1, about 51%, about 52%, about 53%, about 54%, about 55%, about 56%, about 57%, about 58%, about 59%, about 60%, about 62%, about 65%, about 68%, about 70%, about 72%, about 75%, about 78%, about 80%, about 82%, about 85%, about 88%, or about 90% by weight. Similarly, the amount of polymer material may be present in die foam composite in an amount of 10% to 65% by weight, such as 25% to 55%, or 20% to 50% by weight, based on the total weight of the foam composite. In some examples, the polymer material comprises, consists essentially of, or consists of polyurethane. In some examples, the polymer mixture comprises polyurethane and polyurea, e.g., more than 50%, 60%, 70%, 80%, 90%, 95%, or 98% by weight polyurethane and less than 50%, 40%, 30%, 20%, 10%, 5%, or 2% polyurea.

In some examples, the particulate filler includes one or more organic materials and/or one or more fiber materials. Exemplary organic materials include, for example, polymer particles such as pulverized polymeric foam. The fiber materials can be any natural or synthetic fiber, based on inorganic or organic materials. Exemplary fiber materials include, but are not limited to, glass fibers, silica fibers, carbon fibers, metal fibers, mineral fibers, organic polymer fibers, cellulose fibers, biomass fibers, and combinations thereof. The fibers may be at least partially dispersed within the foam composite. In some examples, the fibers are present as individual fibers, chopped fibers, bundles, strings such as yarns, fabrics, papers, rovings, mats, or tows. When present, the amount of fibers may be 15% or less by weight, based on the total weight of the foam composite. For example, the fibers may be present in an amount of about 0.25% to about 15.0%, about 0.5% to about 15.0%, about 1.0% to about 10.0%, or about 0.25% to about 2.5% by weight, based on the weight of the foam composite. In some embodiments, the foam composite does not include any fibers.

The mixtures used to prepare the foam composites herein may further comprise one or more blowing agents. Blowing agents suitable for the present disclosure may have a boiling point higher than room temperature, e.g., greater than about 25° C. (77° F.). A higher boiling point helps to reduce loss of material through evaporation. The blowing agent(s) may have a boiling point greater than about 25° C., greater than about 30° C., greater than about 35° C., greater than about 40° C., or greater than about 45° C. For example, the blowing agent may have a boiling point of 25° C. to 45° C., 27° C. to 40° C., or 30° C. to 35° C., e.g., a boiling point of about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. In some examples, the blowing agent does not contain chlorine or bromine. The blowing agent may have an ODP of zero and/or a GWP (100 yr) less than 100, less than 50, less than 10, or less than 5.

In some embodiments, the blowing agent may comprise water, an organic liquid having a boiling point greater than or equal to 25° C. or 30° C., or a combination thereof. For example, the organic liquid may be a hydrofluoroolefin (HFO) such as hexafluorobutene, an example of which is cis-1,1,1,4,4,4,-hexafluoro-2-butene. Water is generally described as a chemical blowing agent, in that it typically reacts with isocyanate to form an amine and carbon dioxide gas. The gas then becomes trapped in the polymer matrix to form the foam structure. Physical blowing agents are typically in liquid form, wherein the liquid vaporizes in the presence of heat generated by reaction of the isocyanate with the polyol. The blowing agent in gaseous form then becomes trapped in the polymer to form the cells of the foam structure.

The foam composites herein may be prepared using chemical blowing agents, physical blowing agents, or a combination thereof. For example, the blowing agent may comprise water and an HFO having a boiling point greater than or equal to 30° C., wherein the weight ratio of water to HFO is about 0.05 to about 0.5, such as about 0.08 to about 0.4, or about 0.1 to about 0.3. In at least one example, the blowing agent comprises water and hexafluorobutene in a weight ratio of about 0.05 to about 0.5 (water:hexafluorobutene). The total amount of blowing agent may be about 2% to about 7% by weight, based on the total weight of the mixture. For example, the amount of blowing agent may be about 2.5% to about 6.0%, or about 3.5% to about 5.0%, based on the total weight of the mixture.

The foam composites herein may comprise one or more additional materials, such as, e.g., foaming agents, surfactants, chain-extenders, crosslinkers, coupling agents, UV stabilizers, fire retardants, antimicrobials, anti-oxidants, cell openers, and/or pigments. Exemplary surfactants include, but are not limited to, silicone surfactants, such as a polysiloxane-polyether copolymer. Exemplary fire retardants include, but are not limited to, organohalogen compounds and/or organophosphorus compounds, such as tris(chloropropyl)phosphate (TCCP), and other phosphate compounds such as ammonium polyphosphate. In some embodiments, the foam composite is rated a semi-combustible according to ISO 5660-2:2002—Reaction-to-fire tests—Heat release, smoke production and mass loss rate—Part 2: Smoke production rate (dynamic measurement). In some embodiments, the foam composite is non-combustible.

The foam composites herein may be prepared by free rise foaming or by extrusion. In an exemplary procedure, the polyol, isocyanate, particulate filler, and blowing agent (together with other components such as additional isocyanate-reactive monomers, surfactants, fire retardants, or other additives) are combined to form a mixture. The isocyanate may be added together with the other components before mixing, or in some examples, the isocyanate is added after the other components have been mixed together. Similarly, the blowing agent may be added together with the other components and mixed. Or, when the isocyanate is added separately, the blowing agent may be added to the mixture together with the isocyanate. The components may be mixed for a period of time of about 15 seconds to 1 minute, such as about 20 seconds, about 25 seconds, about 30 seconds, about 35 seconds, about 40 seconds, or about 45 seconds.

In the case of free rise foaming, the mixture is typically added to a mold and set aside to allow the mixture to foam. The resulting foam composite can then be cut into a desired shape and/or size, such as sheets or large blocks generally referred to as buns or foam buns. In some embodiments, the foaming may be in a mold or in situ. For instance, the foaming may occur adjacent to a mold surface or a building surface, such that a portion of the foam cell structure contacting such surface compresses or collapses. A portion of the foam cell structure compressed or collapsed may form a skin structure. In the case of extrusion, the mixture may be passed through a vessel of a continuous conveyer system, wherein the mixture foams and is shaped through contact with the walls of the vessel. In both cases, formation of the foam composite can be characterized in terms of the cream time, referring to the time at which the mixture starts to foam or expand, and the tack free time, referring to the period from the start of cure/foaming to a point when the material is sufficiently robust to resist damage by touch or settling dirt.

In some embodiments, the cream time of the foam composite may be about 2 seconds to about 5 minutes, such as about 3 seconds to about 3 minutes, and/or the tack free time may be about 10 seconds to about 30 minutes, such as about 20 seconds to about 25 minutes. Thus, for example, the combined cream time and tack free time may be about 15 seconds to about 45 minutes, such as about 30 seconds to about 30 minutes.

In some examples, the method of preparing the foam composite is devoid of a heating step, e.g., any heat being generated by the reaction itself rather than applied by an external source. As discussed above, the isocyanate and polyol may react when mixed together to form crosslinked polyurethane or other polymer, and generate heat (e.g., no external source of heat applied). The heat may cause the blowing agent to at least partially vaporize. Foaming may occur at a temperature of 50° C. to 120° C., such as 75° C. to 100° C., or 80° C. to 90° C. The reactivity, viscosity, surface tension, and stability of the mixture (e.g., at least partially based on the types of fly ash, polyol, and isocyanate used) and the relative amounts of blowing agents may allow for the appropriate amount of foaming to achieve a low density foam with sufficient compressive strength low thermal conductivity.

In some embodiments, the glass transition temperature and/or the melting point of the foam composite is less than 200° C., such as 50° C. to 200° C., and the thermal degradation temperature of the foam composite is less than 400° C., such as 100° C. to 400° C. The foam composites herein may include cells that are open or closed. A higher percentage of closed cells is expected to provide a denser material with greater strength, whereas more open cells provides for a less dense and more flexible material. The foam composites herein may have a closed cell content that provides sufficient strength and rigidity, which is measured as the ability of the foam composite to deform upon the application of a flexural or compressive stress. Rigidity is also referred to in technical terms as the modulus, which is the ratio of the stress over strain. Flexible foams typically exhibit a modulus of 1 kPa to 100 kPa, whereas rigid foams typically exhibit a modulus between 1 MPa and 1 GPa, while maintaining a low or relatively low density. For example, the foam composites herein may have a modulus of 1 kPa to 100 kPa, such as 10 kPa to 80 kPa, 50 kPa to 90 kPa, 25 kPa to 50 kPa, or 10 kPa to 30 kPa. Further, for example, the closed cell content greater than or equal to 50%, greater than or equal to 60%, or greater than or equal to 70%. In some embodiments, the foam composite may have a closed cell content of 50% to about 75%, about 55% to about 70%, or about 60% to about 75%. The cell content can be measured by ASTM D6226-15.

In some embodiments, the foam composite has a fine cell structure, e.g., a large number of cells with a relatively small cell size. In other embodiments, the foam composite has a coarse cell structure, e.g., a smaller number of cells with a relatively large cell size. The term "fine cell structure" as used herein includes, for example, foam cell structures that have a distribution of pore diameters centered between 100 μm and 500 m. The term "coarse cell structure" as used herein includes, for example, foam cell structures that have a distribution of pore diameters centered at a value higher than 500 μm.

In some embodiments, the foam composite has a low or relatively low density. For example, the foam composite may have an average density of 2 lb/ft$^3$ (pcf) to 40 pcf, such as 2 pcf to 40 pcf, 2 pcf to 25 pcf, 4 pcf to 25 pcf, 2 pcf to 10 pcf, or 4 pcf to 10 pcf (I pcf=16.0 kg/m$^3$). In some examples, the foam composite may have a density greater than or equal to 2 pcf, greater than or equal to 4 pcf, or greater than or equal to 5 pcf, and/or less than or equal to 40 pcf, less than or equal to 30 pcf, less than or equal to 20 pcf, or less than or equal to 10 pcf. Further, in some examples, the foam composite may have a density of about 3.0 pcf, about 3.5 pcf, about 3.8 pcf, about 4.0 pcf, about 4.2 pcf, about 4.5 pcf, about 4.8 pcf, about 5.0 pcf, about 5.1 pcf, about 5.2 pcf, about 5.3 pcf, about 5.4 pcf, about 5.5 pcf, about 5.6 pcf, about 5.7 pcf, about 5.8 pcf, about 5.9 pcf, about 6.0 pcf, about 6.2 pcf, about 6.5 pcf, about 6.8 pcf, or about 7.0 pcf.

The particulate filler of the foam composite may provide improved properties of compressive strength, flexural strength, thermal conductivity, and/or moisture permeance. For example, the foam composites herein may have a compressive strength greater than or equal to 20 psi (145.0 psi=1 MPa), greater than or equal to 40 psi, or greater than or equal to 60 psi, e.g., 20 psi to 200 psi, 30 psi to 180 psi, 50 psi to 100 psi, or 60 psi to 90 psi. Compressive strength can be measured by the stress measured at the point of permanent yield, zero slope, on the stress-strain curve as measured according to ASTM D695-15.

Additionally or alternatively, the foam composite may have a flexural strength greater than greater than or equal to 20 psi, greater than or equal to 40 psi, or greater than or equal to 60 psi. For example, the foam composite may have a flexural strength of 20 psi to 100 psi, such as 30 psi to 80 psi, or 50 psi to 75 psi. Flexural strength can be measured as the load required to fracture a rectangular prism loaded in the three point bend test as described in ASTM C1185-08 (2012), wherein flexural modulus is the slope of the stress/strain curve.

Further, for example, the foam composites herein may have a thermal conductivity less than or equal to 0.050 W/m·K, less than or equal to 0.045 W/m·K, less than or equal to 0.040 W/m·K, less than or equal to 0.035 W/m·K, less than or equal to 0.030 W/m·K, or less than or equal to 0.025 W/m·K. For example, the foam composite may have a thermal conductivity of 0.020 W/m·K to 0.050 W/m·K, such as 0.025 W/m·K to 0.045 W/m·K, or 0.020 W/m·K to 0.040 W/m·K. Thermal conductivity can be measured according to ASTM D5930-17.

In some examples, the foam composites have a moisture permeance per 25 mm thickness equal to or less than 150 ng/m$^2$·s·Pa, such as equal to or less than 146 ng/nm·s·Pa, equal to or less than 142 ng/nm·s·Pa, or equal to or less than 140 ng/m$^2$·s·Pa, e.g., a moisture permeance between 135 ng/m$^2$·s·Pa and 150 ng/m·s·Pa, or between 140 ng/m$^2$·s·Pa and 145 ng/m$^2$·s·Pa. Moisture permeance can be measured by ASTM E96.

Thus, embodiments of the present disclosure provide for foam composites that comply with certain insulation specifications, such as a maximum thermal conductivity of 0.030 W/m·K, a minimum compressive strength of 26 psi, and a maximum moisture permeance of 146 ng/m$^2$·s·Pa per 25 mm thickness. The foam composites herein may be useful in a variety of materials, including, e.g., insulation, such as insulation between concrete walls, and other building materials and construction materials. For example, the foam composites may be used in a sandwich structure, e.g., building materials comprising the foam composite between cement, between gypsum panels, between mineral wool, and other materials and combinations thereof (e.g., between a cement wall and a gypsum panel, etc.). Further, for example, two portions of foam composite may sandwich another material, such as cement between two foam composite panels.

EXAMPLES

The following examples are intended to illustrate the present disclosure without being limiting in nature. It is understood that the present disclosure encompasses additional embodiments consistent with the foregoing description and following examples.

Two polyurethane foam composites were prepared according to each of Table 1 (Foam Composites 1 and 2) and Table 2 (Foam Composites 3 and 4).

TABLE 1

Mixture for Foam Composites 1-2

|  | % wt. |
|---|---|
| Aromatic polyester polyol 1 | 19.06 |
| Water | 0.38 |
| Hexafluorobutene | 3.81 |
| Silicone surfactant | 0.38 |
| Methylene diphenyl diisocyanate | 26.37 |
| Fly ash | 50.00 |
| Total | 100.00 |

TABLE 2

Mixture for Foam Composites 3-4

|  | % wt. |
|---|---|
| Aromatic polyester polyol 2 | 21.47 |
| Water | 0.43 |
| Hexafluorobutene | 4.29 |
| Methylene diphenyl diisocyanate | 23.81 |
| Fly ash | 50.00 |
| Total | 100.00 |

In each case, the polyol, surfactant, blowing agent, isocyanate, and particulate filler were mixed in a 1 gallon bucket in a mixer for either 20 or 45 seconds (see Table 3 below). The contents were then poured into a 12-inch×12-inch box to foam via free rise foaming. The resulting 12-inch×12-inch buns were cut into 8-inch×8-inch×1-inch slices and 3-inch×10-inch×0.47-inch coupons. A control sample was run at a mean temperature of 32.5° C. Each sample was placed in a heat flow meter at a mean temperature of 30° C. thermal conductivity and a mechanical tester for measuring the compressive strength. Results are shown in Table 3.

TABLE 3

| Foam Composite | 1 | 2 | 3 | 4 |
|---|---|---|---|---|
| Mixing time (sec) | 20 | 45 | 20 | 45 |
| Average density (pcf) | 5.5 | 5.8 | 5.6 | 5.4 |
| Average compressive strength (psi) | 62.7 | 73.7 | 75.3 | 69.3 |
| Mean temperature (° C.) | 30.0 | 30.0 | 30.0 | 30.0 |
| Average conduction (W/m · K) | 0.0288 | 0.0287 | 0.0289 | 0.0289 |

The results show a high boiling point blowing agent successfully produced foam composites comprising particulate filler while maintaining a low or relatively low density and sufficient compressive strength for a variety of applications.

It is intended that the specification and examples be considered as exemplary only, with a true scope and spirit of the present disclosure being indicated by the following claims.

What is claimed is:

1. A method of preparing a foam composite, the method comprising:
    providing a mixture of a polyol, an isocyanate, a particulate filler, and a liquid blowing agent comprising an organic liquid having a boiling point equal to or greater than 30° C.; and
    foaming the mixture to obtain the foam composite;
    wherein the foam composite has a density of 2 pcf to 40 pcf, and a thermal conductivity equal to or less than 0.050 W/m·K; and
    wherein the foam composite has a closed cell content equal to or greater than 50%.

2. The method of claim 1, wherein the liquid blowing agent comprises water and a hydrofluoroolefin.

3. The method of claim 2, wherein the liquid blowing agent comprises water and hexafluorobutene in a weight ratio of water to hexafluorobutene of 0.05 to about 0.5.

4. The method of claim 1, wherein the foaming comprises free rise foaming.

5. The method of claim 1, wherein a combined cream time and tack-free time of the mixture 5 seconds to 1 hour.

6. The method of claim 1, wherein a cream time of the mixture is 5 seconds to 3 minutes.

7. The method of claim 1, wherein a tack-free time of the mixture is 20 seconds to 25 minutes.

8. The method of claim 1, further comprising mixing the polyol and the isocyanate for 5 seconds to 1 minute.

9. The method of claim 1, wherein the mixture further comprises an additive selected from a flame retardant, a surfactant, a catalyst, or a combination thereof.

10. The method of claim 1, wherein the foaming is at a temperature of 50° C. to 120° C.

11. The method of claim 1, wherein the method is devoid of a heating step.

12. The method of claim 1, wherein the foaming occurs in a mold or in situ adjacent to a building surface.

13. A method of preparing a foam composite, the method comprising:
    adding a liquid blowing agent to a polyol, an isocyanate, and a particulate filler to form a mixture, wherein the liquid blowing agent comprises an organic liquid having a boiling point equal to or greater than 30° C.; and
    forming the foam composite from the mixture through free rise foaming;
    wherein the foam composite has a closed cell content equal to or greater than 50%.

14. The method of claim 13, wherein the liquid blowing agent comprises water and a hydrofluoroolefin.

15. The method of claim 13, wherein the liquid blowing agent comprises water and hexafluorobutene in a weight ratio of water to hexafluorobutene of 0.05 to about 0.5.

16. The method of claim 13, wherein the particulate filler comprises fly ash.

17. The method of claim 13, wherein the mixture further comprises an additive selected from a flame retardant, a surfactant, a catalyst, or a combination thereof.

18. The method of claim 13, wherein the isocyanate has a viscosity of 25 cP to 700 cP at 25° C.

19. A foam composite comprising polyurethane and a particulate filler, wherein the foam composite is prepared by free rise foaming with a liquid blowing agent comprising water and an organic liquid having a boiling point equal to or greater than 30° C., wherein the foam composite has a density of 2 pcf to 40 pcf and a flexural strength of 20 psi to 100 psi, and wherein the foam composite has a closed cell content equal to or greater than 50%.

20. The foam composite of claim 19, wherein a thermal conductivity of the foam composite is equal to or less than 0.050 W/m·K.

\* \* \* \* \*